United States Patent [19]

Kulprathipanja et al.

[11] Patent Number: 5,127,925
[45] Date of Patent: Jul. 7, 1992

[54] SEPARATION OF GASES BY MEANS OF MIXED MATRIX MEMBRANES

[75] Inventors: Santi Kulprathipanja, Hoffman Estates; Richard W. Neuzil, Downers Grove; Norman N. Li, Arlington Heights, all of Ill.

[73] Assignee: Allied-Signal Inc., Morris Township, Morris County, N.J.

[21] Appl. No.: 346,256

[22] Filed: Apr. 28, 1989

Related U.S. Application Data

[63] Continuation of Ser. No. 158,818, Feb. 22, 1988, abandoned, which is a continuation-in-part of Ser. No. 858,321, May 1, 1986, Pat. No. 4,740,219, which is a continuation-in-part of Ser. No. 697,990, Feb. 4, 1985, abandoned, which is a continuation-in-part of Ser. No. 449,042, Dec. 13, 1982, abandoned.

[51] Int. Cl.$^5$ ................ B01D 53/22; B01D 53/04
[52] U.S. Cl. ........................... 55/16; 55/68; 55/74; 55/75
[58] Field of Search ........... 55/16, 68, 74, 75, 158, 55/387, 389, 522

[56] References Cited

U.S. PATENT DOCUMENTS

| | | | |
|---|---|---|---|
| Re. 31,849 | 8/1985 | Klein | 55/389 |
| 2,924,630 | 2/1960 | Fleck et al. | 55/16 X |
| 3,133,132 | 5/1964 | Loeb et al. | 264/49 |
| 3,246,767 | 4/1966 | Pall et al. | 210/505 |
| 3,545,622 | 12/1970 | Sakhnovsky et al. | 55/389 X |
| 3,567,666 | 3/1971 | Berger | 55/16 X |
| 3,758,996 | 9/1973 | Bowser | 55/389 X |
| 3,791,910 | 2/1974 | Bowser | 55/389 X |
| 3,911,080 | 10/1975 | Mehl et al. | 55/158 X |
| 4,013,566 | 3/1977 | Taylor | 55/387 X |
| 4,032,309 | 6/1977 | Salemme | 55/158 X |
| 4,061,724 | 12/1977 | Grose et al. | 423/335 |
| 4,208,194 | 6/1980 | Nelson | 55/389 X |
| 4,214,020 | 7/1980 | Ward et al. | 55/16 X |
| 4,261,832 | 4/1981 | Schumacher et al. | 55/16 X |
| 4,344,775 | 8/1982 | Klein | 55/75 |
| 4,483,694 | 11/1984 | Takamura et al. | 55/16 X |
| 4,664,683 | 5/1987 | Degen et al. | 55/387 |
| 4,665,050 | 5/1987 | Degen et al. | 55/387 X |

FOREIGN PATENT DOCUMENTS

| | | | |
|---|---|---|---|
| 1792793 | 8/1980 | Fed. Rep. of Germany | 55/16 |
| 1279694 | 12/1961 | France | 55/16 |
| 119418 | 9/1980 | Japan | 55/158 |
| 112022 | 7/1983 | Japan | 55/158 |
| 2143772 | 2/1985 | United Kingdom | 55/158 |
| 2159133 | 11/1985 | United Kingdom | 55/158 |

OTHER PUBLICATIONS

D. R. Paul and D. R. Kemp, "The Diffusion Time Lag in Polymer Membranes Containing Absorptive Fillers", *J. Polymer Sci.:* Symposium No. 41, 79–93 (1973).

*Primary Examiner*—Robert Spitzer
*Attorney, Agent, or Firm*—Raymond H. Nelson; Harold N. Wells

[57] ABSTRACT

A fluid feed mixture, either liquid or gaseous in nature, may be subjected to a gas enrichment separation process. The process is effected by contacting the mixture with the upstream face of a mixed matrix membrane which comprises an organic polymer having a solid particulate adsorbent incorporated therein, the permeability coefficient of the organic polymer being compatible with the permeability coefficient of the adsorbent. The permeate which emanates from the downstream face of the membrane comprises a fluid product mixture in which the proportion of the first fluid component of the feed mixture, which possesses a greater steady state permeability in relation to the second fluid component, is greater than the proportion present in the original fluid feed mixture.

9 Claims, No Drawings

SEPARATION OF GASES BY MEANS OF MIXED MATRIX MEMBRANES

CROSS-REFERENCE TO RELATED APPLICATIONS

This application is a continuation of Ser. No. 158,818, filed Feb. 22, 1988 and now abandoned which is a continuation-in-part of our copending application Ser. No. 858,321 filed May 1, 1986 and issued as U.S. Pat. No. 4,740,219, which is a continuation-in-part of application Ser. No. 697,990 filed Feb. 4, 1985, now abandoned, which is a continuation-in-part of application Ser. No. 449,042 filed Dec. 13, 1982, now abandoned, all teachings of which are incorporated herein by reference thereto.

BACKGROUND OF THE INVENTION

The present invention relates to separation processes and in particular to the use of a mixed matrix membrane combination to achieve such separation as well as to the preparation of such a combination and the composition of said composition.

DESCRIPTION OF THE PRIOR ART

In recent years, polymeric membranes have attracted a great deal of interest for use in gas separation. For example, some membranes which are used would include silicone membranes for oxygen/nitrogen separation, cellulose acetate membranes for carbon dioxide removal from natural gas and silicone-coated polysulfone membranes for hydrogen recovery from various waste streams. In a typical operation, a pressure differential is maintained across the polymeric membrane and provides the driving force for the permeation. Two properties of the membrane are of critical importance in determining the performance characteristic which is possessed by the membrane. The first property is the solubility of the gas in the membrane while the second property is the diffusivity of the gas in the membrane material. The product of these two properties, that is, solubility and diffusivity, is called the permeability. The higher the membrane permeability factor, the more attractive is the use of membranes for a gas separation process. As will hereinafter be shown in greater detail, the permeability of a polymeric membrane may be increased as well as altered by forming a mixed matrix membrane and thus providing a novel membrane of this invention.

With respect to some of the gas separation membranes heretofore known, it is taught in U.S. Pat. No. 4,243,701 to Riley et al. that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

The use of adsorbents such as zeolites and silicalite in separating components from fluid mixtures is also long known. In the adsorption type separation process the adsorbent exhibits selectivity of one mixture component over another. Zeolites are hydrophilic crystalline aluminosilicates.

Silicalite, a particular zeolite, is a hydrophobic crystalline silica-based molecular sieve which has been developed and patented (see U.S. Pat. No. 4,061,724 to Gross et al). A detailed discussion of silicalite may be found in the article "Silicalite, A New Hydrophobic Crystalline Silica Molecular Sieve"; Nature, Vol. 271 Feb. 9, 1978, incorporated herein by reference.

Adsorptive separation processes such as those using zeolites are very different from membrane processes. In the typical adsorption process, a gas mixture is allowed to come to equilibrium with the adsorbing material and the solid adsorbent thus concentrates the desired gas component. A separate step such as heating the adsorbed phase or passing inert gas over the adsorption bed is required to remove and collect the desired gas component. Hence, an adsorption process requiring distinct adsorption and desorption steps is very different from a membrane process and, in general, there is no correlation between materials which are useful in adsorptive processes and those used for membrane processes.

There are numerous references which disclose the incorporation of various materials within separation membranes. U.S. Pat. Nos. 3,457,170 to Havens; 3,878,104 to Guerrero; 3,993,566 to Goldberg et al; 4,032,454 to Hoover et al; and 4,341,605 to Solenberger et al teach the use of structural supports or reinforcement fibers or fabrics to aid the membrane in resisting the high pressures used in the reverse osmosis process. U.S. Pat. No. 3,556,305 to Shorr shows a "sandwich" type reverse osmosis membrane comprising a porous substrate covered by a barrier layer, in turn covered by a polymer or film bonded to the barrier layer by an adhesive polymeric layer. U.S. Pat. No. 3,862,030 to Goldberg shows a polymeric matrix having an inorganic filler such as silica dispersed throughout which imparts a network of micro-voids or pores of about 0.01 to about 100 microns, capable of filtering microscopic or ultrafine particles of submicron size. U.S. Pat. No. 4,302,334 to Jakabhazy et al discloses a membrane "alloy" comprising a hydrophobic fluorocarbon polymer blended with polyvinyl alcohol polymer which imparts hydrophilic properties to the membrane.

The incorporation of particular moleculae sieves into polymeric membranes is also disclosed in the art. In the article "The Diffusion Time Lag in Polymer Membranes Containing Adsorptive Fillers" by D. R. Paul and D. R. Kemp, J. Polymer Sci.; Symposium No. 41, 79–93 (1973), the specific mixed matrix membrane used was a Type 5A (Linde) zeolite incorporated with a silicone rubber matrix. The Paul et al article illustrates that the zeolite "filler" causes a time lag in reaching steady state permeation of the membrane by various gases due to the adsorption of the gases by the zeolite. It is taught in this article that once the zeolite becomes saturated by the permeating gas a steady state rate of permeation through the membrane is reached resulting in substantially the same selectivity as if the zeolite was not present.

In addition to the aforementioned references, U.S. Pat. No. 4,340,428 discloses a semi-permeable asymmetrical membrane which is useful for the desalination of water utilizing a reverse osmosis process. The membrane which is used for this purpose comprises a cellulose acetate polymer which has incorporated therein a swelling medium consisting of an organophilic bentonite. However, the reference does not maintain that a change in salt rejection is accomplished by the presence of the bentonite. The patent states that the long-chain hydrocarbon modified bentonite, which is employed as a swelling agent, serves as this swelling agent due to the "dispersion of the hydrocarbon chains, during which the clay mineral flakes increasingly separate from one another, putting into effect the process of gelling or swelling of the organophilic bentonite". This organophilic bentonite is present only for the purpose of affecting a resistance to compaction of the membrane. The salt rejection performance of the membrane which is accomplished is that of a pure cellulose acetate membrane rather than a change in selectivity. Thus, the objective to be accomplished by the presence of the organophilic bentonite is to obtain a stable membrane which does not compact during the process due to the reverse osmosis pressure which is applied to the system during the desalination of the water.

U.S. Pat. No. 2,924,630 discloses a process for fluid diffusion fractionation which utilizes an aluminosilicate for the separation of gases or liquids. The aluminosilicate barrier which is used is maintained in either the form of a filter cake on one surface of a permeable solid support or it may be mechanically depressed into or dispersed in the pores of a fluid permeable material. The supporting materials will comprise porous supports made from certain plastics such as casting resins, sintered metals, ceramic-type materials such as Alundum, aloxite and the like. The metals or casting resins are used as a binder which holds one particle of the aluminosilicate to another. This separator, the steady state permeability of the alumino silicate, has not been altered by the porous support as occurs in the present invention. Therefore, the materials which act as supports serve merely as physical supports for the adsorbent while still permitting the fluid to pass therethrough.

U.S. Pat. No. 2,924,630 also teaches use of a solidifiable material such as a casting resin, a molten metal or other material which is allowed to harden to cover a single layer of the zeolite silicate which is positioned between the elements of wire or other reinforcing mesh. The resinous matrix material which is exemplified must be ground away in order to expose both the upper and lower surfaces of the adsorbent, which is in contrast to the present invention, as hereinafter more fully described, which does not require that the surface of the adsorbent be exposed to the liquid which is being subject to separation. It is to be noted, the patent teaches that the transport of the gas or liquid is merely through the zeolite crystal and not through the binder. This composite is not a mixed matrix membrane due to the single phase transport of the material through the barrier which is in contrast to the type of mixed matrix membrane which forms the basic of the present invention. If one were to look at the teachings of U.S. Pat. Nos. 4,340,428 and 2,924,630 in combination, a person skilled in the art would be led away from the teachings we have now discovered.

U.S. Pat. No. 3,246,767 discloses fluid-permeable materials comprising a porous base having superimposed thereon a microporous layer which impregnates the base, said base comprising a fibrous material of which a proportion of fibers extend outwardly from the porous base. This patent does not teach a solution cast membrane such as that which is utilized in the present invention which includes a particulate adsorbent. In contradistinction to this, the patent discloses a material comprised of a multitude of fibers attached to a porous base in which the fibers may be employed together with particulate materials. Likewise, U.S. Pat. No. 4,344,775 discloses the use of silicalite as an adsorbent in a gas-vapor treating mat comprised of glass fibers intermixed with micro-bits of an expanded thermoplastic polymer and an organic bonding agent.

In addition to this patent, other references such as U.S. Pat. No. 4,061,724 and the article by Flanigen in *Nature*, Volume 271, which were previously mentioned, teach that silicate may indeed serve as an adsorbent for use in selectively adsorbing organic materials from water. However, these references are silent as to the use of silicalite in conjunction with a solution cast semipermeable membrane of the present invention. Indeed, these references teach away from the use of an adsorbent in the separation of gases inasmuch as the references focus specifically on the separation of organic compounds from water.

U.S. Pat. No. 4,061,724 discloses multi-zoned fiber permeators which comprise a plurality of selectively permeable hollow fibers which are suitable for the selective permeation of at least one fluid in a fluid mixture containing at least one other fluid. While this patent discloses a wide variety of polymers which may be employed in the membrane, it is completely silent with regard to the inclusion of an adsorbent material in the membrane of the present invention.

U.S. Pat. No. 4,344,775 discloses the use of silicalite as an adsorbent in a matte which is comprised of glass fibers intermixed with micro-bits of an expanded thermoplastic polymer and an organic bonding agent. The patent teaches that the silicalite has a very low selectivity for the adsorption of water and a very high preference for the adsorption of organic molecules smaller than its limiting size, said silicalite being useful for the separation of lower alcohols, phenol, pentane and hexane from a fluid stream containing the same, even in the presence of water. However, this patent fails to suggest the use of silicalite, or for that matter any other adsorbent, with a solution cast semipermeable membrane of the present invention. The use of an adsorbent with such a membrane is contrasted with "gas-vapor treating matte" comprised of glass fibers intermixed with the micro-bits of an expanded thermoplastic resin and a bonding agent which is taught in this patent. The patent is totally silent with regard to the separation of gases but instead seeks to purify the gaseous stream by removing undesirable substances therefrom.

Another U.S. Pat. No. 4,220,535, discloses multi-zoned hollow fiber permeators which are comprised of a plurality of selectively permeable hollow fibers which are suitable for the selective permeation of at least one fluid in a fluid mixture containing at least one other fluid. However, while this patent discloses a variety of polymers which can be employed in the membrane the patent is completely silent with regard to the inclusion of adsorbent material in the membrane which will alter the steady state permeability of the membrane.

U.S. Pat. No. 4,243,701 is directed to a method for the preparation of a gas separation membrane which comprises a porous support such as cellulose acetate coated with a thin film of a semipermeable membrane formed from a prepolymer such as dimethylsilicon or styrene. However, no mention is made in this patent with regard to the inclusion of an adsorbent within the membrane.

In contradistinction to the prior patents and articles which have been heretofore discussed, we have now discovered a novel and highly advantageous method of preparing a mixed matrix membrane as well as uses for the membrane for which it is uniquely suitable, such membranes having not been disclosed by any of the known art, either alone or in combination. We have also discovered that the mixed matrix membrane, when prepared according to the process of the present invention, is unique in its character inasmuch as the steady state permeability of the membrane has been altered by the inclusion of solid particulate adsorbents thereon, in such a manner so as to permit a desired selectivity with respect to the passage of a predetermined fluid, and particularly a gas, from a mixture of fluids or gases through the mixed matrix membrane. We have further developed a specific combination of ingredients making up a mixed matrix membrane which heretofore has not been known prior to our invention.

BRIEF SUMMARY OF THE INVENTION

This invention relates, in one embodiment thereof, to a process for the separation of a first gas component from a fluid feed mixture which comprises a first gas component and a second gas component by contacting the aforesaid gas feed mixture with the upstream face of a mixed matrix membrane which consists of an organic polymer having a solid particulate adsorbent incorporated therein, and recovering a permeate in which the first gas component of the gas feed mixture is present in a greater proportion than was present in the gas feed mixture.

Another feature of the present invention is method of manufacture of a mixed matrix membrane comprising adsorbent particles incorporated with a membrane material, the method comprising: (a) forming a slurry of the adsorbent particles in a solvent in which the membrane material is soluble; (b) thoroughly stirring the slurry so as to obtain a highly uniform dispersion of the particles in the solvent; (c) adding the membrane material to the slurry while continuing to stir the slurry until a suspended homogeneous solution is obtained; and (d) casting the solution to obtain said mixed matrix membrane.

In addition, a supplemental feature of the present invention is a mixed matrix membrane which has been prepared according to the method herein-before set forth.

It is therefore an object of this invention to provide a process for separating various components of a gas feed mixture either liquid or gaseous in nature by utilizing a mixed matrix membrane.

In one aspect, an embodiment of this invention is found in a process for the separation of a first gas component from a gaseous feed mixture comprising a first gas component and a second gas component by contacting, at separation conditions, said mixture with the upstream face of a solution cast mixed matrix membrane consisting of an organic polymer selected from the group consisting of polycarbonates, polyamides, polysulfone and polysilicone having a solid particulate adsorbent incorporated therein, the steady state permeability of said mixed matrix membrane being different than the steady state permeability of said organic polymer, said first gas component having a greater steady state permeability than said second gas component, and recovering after said contacting, a permeate which comprises gaseous product mixture in which the proportion of said first gas component to said second gas component is greater than the proportion of said first gas component to said second gas component in said gaseous feed mixture.

Other objects and embodiments will be found in the following further detailed description of the present invention.

DETAILED DESCRIPTION OF THE INVENTION

As hereinbefore set forth, the present invention is partially based on the aforementioned art concerning membranes, particularly membranes comprising polymeric organic materials. The present invention also utilizes one or more of the well-known adsorbents such as zeolites, silicalite, activated carbon or ion-exchanged resins. The present invention, however, in a manner not known to the art, provides a mixed matrix membrane by incorporating the adsorbent with a polymeric organic material which forms a membrane to create the desired composite in which the steady state permeability of the mixed matrix membrane differs from the steady state permeability which was possessed by the polymeric organic material, and uses that creation in a unique process for separating fluid components such as gases from each other in a manner which would otherwise be difficult or impossible to effect the separation.

Those skilled in the art of membrane separation technology know that different components of a fluid system may pass through a properly selected membrane at different rates due to different diffusivity and solubility characteristics (hereinafter collectively referred to as "permeability") of each component in the membrane. This phenomenon may be expressed in terms of a separation factor as defined in the formula:

$$A/B = \frac{(C_A/C_B)P}{(C_A/C_B)R}$$

where
  A/B = separation factor;
  $(C_A/C_B)P$ = concentration of component A—concentration of component B in the permeate phase (emanating from the downstream face of the membrane);
  $(C_A/C_B)R$ = concentration of component A—concentration of component B in the raffinate phase (at the upstream face of the membrane).

The higher the separation factor, the better the separation that will be achieved. An A/B of over 3.0 is considered conducive to an excellent separation.

We have made the discovery that when a properly selected adsorbent is incorporated with a particular membrane in a certain manner to obtain a mixed matrix membrane, a surprising and unexpected increase will occur with regard to the separation factor of that membrane for a given fluid mixture. This difference in separation factor is due to the alteration in steady state permeability which has been imparted to the mixed matrix membrane in contrast to the steady state permeability of the organic polymer. We have thus obtained by our discovery a viable process in which fluid components, and particularly gases, may be separated from a mixture because of the marked differences in their respective permeabilities through the mixed matrix membrane, which marked differences do not occur in an adsorbent-free membrane. Furthermore, in contradistinction to the teachings of the above Paul et al article, we have discovered that proper selection of an adsorbent and membrane material for a given system will enable long term steast state permeation with a corresponding selectivity of desired fluids such as gases through the mixed matrix membrane to be achieved as opposed to the trivial short term effect noted by Paul et al.

The mixed matrix membrane which is prepared according to the process of the present invention, will possess the ability to effect the separation of various components of a fluid, and particularly a gaseous, feed mixture by utilizing the steady state permeability characteristic of each component of the mixture. The desired effect is achieved by incorporating an adsorbent of the type hereinafter set forth in greater detail with certain polymeric materials, the permeability coefficient of the polymer being compatible with the permeability coefficient of the adsorbent, the two permeability coefficients preferably being within an order of magnitude of one to the other. By utilizing such a combination, it is possible, as will hereinafter be shown in greater detail, to alter the separation factors of polymeric materials as well as to provide a desired selectivity factor which is not found in all mixed membranes.

The mixed matrix membranes of our invention comprise certain organic polymer materials having a solid particulate adsorbent incorporated therein. The mixed matrix membrane of our invention will comprise an adsorbent incorporated in certain organic polymer materials. In the preferred embodiment of the invention, the organic polymer material will be selected from the group consisting of polysulfones, polycarbonates, polyethers, polysilicones and polyamides. The solid particulate adsorbent material which is incorporated in the aforesaid organic polymers will be selected from the group consisting of zeolites such as crystalline aluminosilicates, silicalite, inorganic oxides, activated carbon or an ion-exchange resin. The selection of ingredients for the mixed matrix membrane will depend on the feed mixture from which the components are to be separated. For example, the feed mixture may be a liquid or a gas; in the latter case we have found a mixed matrix membrane comprising silicalite (preferably from about 5 wt. % to about 25 wt. %) incorporated with a polysilicone will have a utility, particularly in separating oxygen from nitrogen or carbon dioxide from hydrogen. In those two separations, oxygen and carbon dioxide, respectively, are the more permeable gases.

The performance of the mixed matrix membrane of the present invention is particularly surprising and unexpected in view of the unpredictability of steady state separation factors which are inherent in various adsorbent-membrane systems. For example, when attempting to separate carbon dioxide from hydrogen, it is known that hydrogen has a greater permeability through a plain cellulose acetate membrane as has been shown in prior references and, on the other hand, that silicalite has a greater adsorptive affinity for carbon dioxide. There is no way that a person skilled in the art could have predicted from this knowledge that a steady state separation process could be achieved when utilizing a mixed matrix membrane comprising cellulose acetate having silicalite as the solid particulate adsorbent incorporated therein, whereby a permeate stream enriched in carbon dioxide could be obtained and with the silicalite not simply becoming saturated with carbon dioxide and ceasing to influence the separation of carbon dioxide from hydrogen.

The above example with regard to the separation of carbon dioxide and hydrogen readily illustrates the unexpected results which are obtained by utilizing a mixed matrix membrane in which the steady state permeability of the mixed matrix membrane has been altered with respect to the steady state permeability of the organic polymer, this being in conjunction with the corresponding alteration of the steady state selectivity of the components with respect to the passage of the particular fluid component (either gas or liquid) through the mixed matrix membrane. However, as will hereinafter be shown in greater detail by comparable examples, this phenomenon is only noticeable when the adsorbent which is incorporated into the organic polymeric membrane possesses a permeability coefficient which is compatible with the permeability coefficient of the polymer.

The separation of the two or more components of a fluid feed mixture, such as a mixture of gases, according to the process of the present invention when utilizing the novel mixed matrix membranes may be effected over a wide range of separation conditions. For example, the separation may be effected when utilizing ambient temperatures (20°–25° C.) and a pressure which may be in the range of from about 69 kPa to about 3447 kPa (10 to 500 psig) on the upstream phase of the mixed matrix membrane. The flux, or rate of permeation, through the membrane is directly proportional to the pressure differential across the face of the membrane.

Another aspect of our invention is the novel and highly advantageous method that we have discovered to make mixed matrix membranes. In its broadest embodiment, the method involves forming a slurry of solid particulate adsorbent particles in which the membrane material is soluble, thoroughly mixing the slurry to obtain a highly uniform dispersion, adding the membrane material to the slurry while continuing to mix until a suspended homogeneous solution is obtaned and casting the solution to obtain the mixed matrix membrane. We have found adding the solid particulate adsorbent particles to the solvent prior to introduction of the membrane material to be very important from the standpoint of the quality of the mixed matrix membrane ultimately obtained, i.e., the freedom of the membrane from air pockets and perforations. In contradistinction, the Paul et al article teaches at page 85 to disperse the molecular sieve particles directly into the prepolymer. We believe that the solvent serves to drive air out of the pores of the adsorbent so that when the membrane material is added there will be no air to form pockets and pinholes.

The constant mixing as mentioned in the above method is also very important. Mixing will, of course, facilitate a uniformity of the dispersion of the adsorbent particles in the membrane, and in minimizing the clumping together of the particles will further preclude the formation of pinholes. Mixing is best effected by ultrasonic means.

The membrane material, in which the adsorbent is incorporated, deemed most likely for use in the method of the present invention, comprises an organic polymer of the type hereinbefore mentioned which may be employed to form the membrane material, and that the particular polymer and solvent which are utilized to form the casting solution will be dependent upon the particular polymer which is employed.

The casting of the solution as mentioned in the above method is preferably effected, at least when the membrane material comprises an organic polymer, by (a) pouring the solution onto a flat surface; (b) slowly removing substantially all of the solvent from the solution so as to cause gelation of the solution and formation of a membrane; (c) submerging the membrane in a hot liquid bath to cause the annealing of the membrane; and (d) drying the membrane. Under certain circumstances the solvent is removed solely by evaporation, e.g. when using a silicone as the membrane material and Freon as the solvent. However, under other circumstances, a portion of the solvent may be removed by evaporation followed by submerging the partially formed membrane in a liquid bath in which the solvent is soluble, e.g., a polysulfone as the membrane material, acetone or N,N'-dimethylformamid as the solvent and ice water as the bath liquid. Annealing, on the other hand, might be carried out in a hot water bath at a temperature of from about 50° C. to about 100° C. It is believed that annealing causes the polymer chains comprising the membrane material to line up in a parallel manner rather than cross over each other which serves to further minimize the creation of undesirable voids.

The following examples are presented for purposes of illustrating a method for preparing a mixed matrix membrane of the present invention as well as the use thereof in effecting a separation of two components of a fluid feed mixture.

EXAMPLE I

A mixed matix membrane of about 30 microns in thickness was prepared in accordance with the method of the present invention by the following steps:

1) 2.5 grams of silicalite powder was stirred by ultrasonic means in 15 grams of a solvent comprising Freon TF at room temperature for about 3 hours;

2) 11.1 grams of a mixed silicon was added to the silicalite-Freon suspension, the suspension was stirred until a suspended homogeneous solution was obtained with a partial vacuum being applied for a short period of time in order to ensure the removal of all air bubbles;

3) The solution was poured on the top horizontal surface of a clean glass plate and a portion of the Freon was allowed to slowly evaporate;

4) After drying, the membrane was cured at a temperature of 82° C. for a period of 1 hour.

EXAMPLE II

A piece of the mixed matrix membrane which had been prepared according to the method described in Example I was cut to an appropriate size and used in a test cell to determine the ability of the membrane to separate oxygen from nitrogen. The upstream face of the membrane was exposed to air and a differential pressure of 1034 kPa (150 psig) was maintained across the membrane. The gas emanating from the downstream face of the membrane, i.e., the permeate, was analyzed and analysis disclosed that the separation factor ($\alpha O_2/N_2$) was 2.14.

EXAMPLE III

In a manner similar to that set forth in the above examples, 2 grams of boehmite, 0.4 grams of silicon RTV 615B and 3.7 grams of silicon RTV 615A were mixed in 40 grams of Freon TF. The mixed matrix membrane which was formed by casting the solution on a glass plate and curing at a temperature of 82° C. for one hour was cut to an approximate size and used in a test cell to determine the ability of the membrane to separate oxygen from nitrogen. The upstream face of the membrane was exposed to a feed mixture of air while maintaining a differential pressure of 1034 kPa (150 psig) across the membrane. The gas emanating from the downstream face of the membrane was analyzed and it was found that the calculated separation factor was 2.19.

EXAMPLE IV

In this example, a membrane was prepared by admixing 1.1 grams of silicone RTV 615B and 10 grams of silicone RTV 615A in 15 grams of a solvent comprising Freon TF. The casting solution which contained no adsorbent such as silicalite or boehmite was cast on a glass plate and cured at a temperature of 82° C. for one hour. The permeation test of this membrane utilizing a feed mixture comprising air disclosed a calculated separation factor of 2.03.

EXAMPLE V

A mixed matrix membrane was prepared by stirring 2.5 grams of gamma-alumina in 40 grams of acetone at room temperature for about three hours utilizing ultrasonic means to accomplish the stirring. Following this, 10 grams of cellulose acetate which possessed an acetyl content of 39.8% was added to the suspension of alumina in acetone, the suspension was stirred until a suspended homogeneous solution was obtained while applying a partial vacuum for a short period of time to ensure removal of all air bubbles. The resulting solution was poured on the top horizontal surface of a clear glass plate and a portion of the acetone was allowed to slowly evaporate until a film had formed on the upper surface of the solution. The thin film membrane was allowed to set for a period of two minutes and was then submerged in an ice water bath for a period of two minutes. The formed membrane was removed from the ice water bath and submerged in a hot water bath which was maintained at a temperature of 90° C. for a period of one hour. Thereafter, the membrane was dried by placing it between paper towels with a glass plate on either side as a means for preventing the membrane from curing, followed by placing the membrane in air to effect a complete drying.

A piece of the mixed matrix membrane prepared according to the above paragraph was utilized in two permeation tests in a test cell utilizing a test similar in nature to that set forth in the above examples. The permeation test using air as the feed stream at a pressure of 1034 kPa (150 psi) disclosed the separation factor ($\alpha O_2/N_2$) was 4.33. A second sample of the membrane was used in a permeation test employing a carbon dioxide/hydrogen feed stream at 345 kPa (50 psi). The separation factor for this test was $2.05 \pm 0.47$.

EXAMPLE VI

In a manner similar to that set forth in the above examples, 1.2 grams of a polysulfone may be admixed with a solvent comprising N,N'-dimethylformamide. After treatment in a manner similar to that set forth in Example I above, 10 grams of a zeolite may be added to the suspension which is then stirred until a suspended homogeneous solution is obtained. The solution may then be poured onto a clean glass plate and the Freon allowed to evaporate until a film is formed on the upper surface of the solution. The membrane is then allowed to set submerged in an ice water bath, followed by submersion in a hot water bath and thereafter dried.

The cured membrane may then be used in a permeation test to separate carbon dioxide from a carbon dioxide/hydrogen feedstream.

EXAMPLE VII

In this example, 1 grams of a polyamide may be dissolved in a solvent comprising formic acid/methanol and after being stirred for a period of about 3 hours, 10 grams of activated carbon may be added to the suspension. The suspension is then stirred until a suspended homogeneous solution is obtained and the solution is then poured onto a glass plate. A portion of the formic acid/methanol is allowed to evaporate until a thin film is formed on the surface, following which the membrane is dried in a manner similar to that set forth in Example V above. After drying and curing, the membrane may then be used in a permeation test to determine the ability of the membrane to separate oxygen from nitrogen.

We claim as our invention:

1. A process for the separation of oxygen and nitrogen from a gaseous feed mixture containing same by contacting, at separation conditions, said mixture with the upstream face of a solution cast mixed matrix membrane, consisting essentially of polysilicone having a solid particulate adsorbent incorporated therein, the steady state separation factor for oxygen in nitrogen being increased compared to the steady state separation factor of a membrane consisting of said polysilicone without said solid particulate adsorbent, said oxygen having a greater steady state permeability than said nitrogen, and recovering from the downstream face of said membrane after said contacting, a permeate which comprises said oxygen in greater proportion than said nitrogen.

2. The process as set forth in claim 1 in which said separation conditions include ambient temperatures and a pressure in the range of from about 10 to about 5000 lbs per square inch gauge.

3. The process as set forth in claim 1 in which said mixed matrix membrane contains from about 5% to about 25% by weight of said solid particulate adsorbent.

4. The process as set forth in claim 1 in which said solid particulate adsorbent comprises a zeolite.

5. The process as set forth in claim 4 in which said zeolite comprises a crystalline aluminosilicate.

6. The process as set forth in claim 1 in which said solid particulate adsorbent comprises a silicalite.

7. The process as set forth in claim 1 in which said solid particulate adsorbent comprises an activated carbon.

8. The process as set forth in claim 1 in which said solid particulate adsorbent comprises an inorganic oxide.

9. The process as set forth in claim 1 in which said organic particulate adsorbent comprises an ion exchange resin.

* * * * *